(12) United States Patent
Müller et al.

(10) Patent No.: US 11,967,787 B2
(45) Date of Patent: Apr. 23, 2024

(54) FUSE ELEMENT FOR A CONNECTOR, CIRCUIT BOARD ASSEMBLY AND PROBE

(71) Applicant: Endress+Hauser Conducta GmbH+Co. KG, Gerlingen (DE)

(72) Inventors: Andreas Müller, Ostfildern (DE); Matthias Grossmann, Vaihingen/Enz (DE); Judith Raupp, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 260 days.

(21) Appl. No.: 17/376,578

(22) Filed: Jul. 15, 2021

(65) Prior Publication Data
US 2022/0021163 A1      Jan. 20, 2022

(51) Int. Cl.
*H01R 13/66* (2006.01)
*G01N 21/85* (2006.01)
(Continued)

(52) U.S. Cl.
CPC .............. *H01R 13/66* (2013.01); *G01N 21/85* (2013.01); *H01R 12/7005* (2013.01);
(Continued)

(58) Field of Classification Search
CPC ............ H01R 13/6581; H01R 13/5205; H01R 43/04; H01R 13/66; H01R 12/7005; H01R 13/40; H01R 13/502; H01R 13/62; H01R 12/722; H01R 13/633; H01R 43/26; H01R 13/6275; H01R 13/639; H01R 12/71; G01N 21/85; G01N 21/8507; G01N 21/01; H05K 1/11; H05K 1/18
See application file for complete search history.

(56) References Cited

U.S. PATENT DOCUMENTS 6,604,861 B2 *   8/2003   Chen .................... G02B 6/3897
                                                       439/942
6,931,696 B2 *   8/2005   Lee .................... B60R 21/01546
                                                       24/642
(Continued)

FOREIGN PATENT DOCUMENTS

CN          101212091 A        7/2008
CN          102017317 A        4/2011
(Continued)

*Primary Examiner* — Abdullah A Riyami
*Assistant Examiner* — Nader J Alhawamdeh
(74) *Attorney, Agent, or Firm* — Kelly J. Smith; Endress+Hauser (USA) Holding, Inc.

(57) ABSTRACT

The present disclosure relates to a securing element for a connector, comprising a securing element body having a receptacle that is designed to encompass at least one rear segment of a cable connector element connected to at least one cable, and having a base running substantially perpendicular to the connection direction of the cable connector element, said base having an opening through which the at least one cable connected to the cable connector element can be guided, wherein the base is designed to positively enclose a cable-side end face of the cable connector element; and wherein the securing element body has at least two snap hooks that extend in the plug-in direction and which in each case have at their free end a latching element, such as a latching lug.

13 Claims, 3 Drawing Sheets

(51) Int. Cl.
   *H01R 12/70* (2011.01)
   *H01R 13/40* (2006.01)
   *H01R 13/502* (2006.01)
   *H01R 13/62* (2006.01)

(52) U.S. Cl.
   CPC ........... *H01R 13/40* (2013.01); *H01R 13/502* (2013.01); *H01R 13/62* (2013.01)

(56) References Cited

U.S. PATENT DOCUMENTS

| | | | | |
|---|---|---|---|---|
| 9,048,562 | B2* | 6/2015 | Muller | H01R 43/04 |
| 9,651,710 | B2* | 5/2017 | Donzier | G01N 21/8507 |
| 9,664,868 | B2* | 5/2017 | Logan, Jr. | G02B 6/428 |
| 9,865,973 | B2* | 1/2018 | Engl | H01R 12/716 |
| 2001/0045532 | A1 | 11/2001 | Schulz et al. | |
| 2004/0111845 | A1* | 6/2004 | Lee | B60R 22/48 24/303 |
| 2005/0233639 | A1* | 10/2005 | Blosch | H01R 13/5219 439/587 |
| 2007/0155218 | A1 | 7/2007 | Wu | |
| 2010/0268858 | A1* | 10/2010 | Lee | G06F 13/409 710/74 |
| 2011/0053421 | A1* | 3/2011 | Mostoller | H01R 13/562 439/625 |
| 2013/0084747 | A1* | 4/2013 | Dendas | H01R 13/6593 439/607.41 |
| 2014/0024238 | A1* | 1/2014 | Muller | H01R 13/5205 29/857 |
| 2015/0161701 | A1 | 6/2015 | Wu et al. | |
| 2015/0318636 | A1* | 11/2015 | Lappoehn | H01R 13/6272 439/660 |
| 2016/0204554 | A1* | 7/2016 | Yasuda | G02B 6/4416 439/620.22 |
| 2016/0327683 | A1* | 11/2016 | Donzier | E21B 49/082 |
| 2016/0370547 | A1* | 12/2016 | Logan, Jr. | G02B 6/4246 |
| 2017/0294748 | A1* | 10/2017 | Engl | H01R 13/6594 |
| 2018/0145447 | A1* | 5/2018 | Xu | H02S 40/36 |
| 2022/0021163 | A1* | 1/2022 | Müller | H01R 13/6275 |

FOREIGN PATENT DOCUMENTS

| | | |
|---|---|---|
| CN | 102751624 A | 10/2012 |
| CN | 104733956 A | 6/2015 |
| CN | 107228300 A | 10/2017 |
| CN | 208334220 A1 | 1/2019 |
| CN | 111051927 A | 4/2020 |

* cited by examiner

FUSE ELEMENT FOR A CONNECTOR, CIRCUIT BOARD ASSEMBLY AND PROBE

CROSS-REFERENCE TO RELATED APPLICATION

The present application is related to and claims the priority benefit of German Patent Application No. 10 2020 118 751.3, filed on Jul. 15, 2020, the entire contents of which are incorporated herein by reference.

TECHNICAL FIELD

The present disclosure relates to a securing element for a connector, a circuit board assembly and a probe for optical measurements in a measuring medium.

BACKGROUND

Probes used in process metrology for measuring parameters of a measuring fluid, e.g. turbidity, SAC (spectral absorption coefficient) or concentrations of certain substances such as nitrate, are permanently located in the measuring medium during measuring operation. The measuring medium can be a measuring fluid, e.g., a solution, a dispersion or a suspension, for example. To transmit measured values of the parameter to be measured, such probes are connected via a cable to higher-level measuring electronics, e.g. in the form of a measuring transducer or an industrial PC. For example, a fluid-tight cable connection to an optical probe is known from DE 10 2012 106421 A1. The probe has a circuit, arranged on a printed circuit board, that is connected to the cable via a connector. The connector shown in DE 10 2012 106421 A1 has no special protections against an unwanted detachment of the connector. During process operation of the probes, it may happen that unsecured connectors unintentionally disengage, for example due to mechanical loads (e.g. vibrations, impacts, etc.).

Various connectors secured against unwanted detachment are known in the prior art. One possible type of securing is based on the use of latching elements which engage in one another when the connector components are being connected, and in this way prevent a movement counter to the connection direction. Another type of securing is ensured by plugs which have a threaded nut, which plugs being screwed to the complementary bushing. Connectors between circuit boards and cable connectors to be connected to the circuit boards are usually secured by connector elements having additional locking elements or threaded connections. However, all of these solutions occupy a relatively large space on the circuit board. On the other hand, probes that are integrated into processes, for example lines or containers, should be designed to be as compact as possible.

SUMMARY

It is therefore the object of the present disclosure to specify a securing element for a connector, and a circuit board assembly having a connector, which is secured against unwanted detachment, and which can be used in a probe in a space-saving manner for measurements in a measuring medium, such as optical measurements.

The securing element according to the present disclosure for a connector comprises a securing element body having a receptacle that is designed to encompass at least one rear segment of a cable connector element connected to at least one cable, and which has a base running substantially perpendicular to the connection direction of the cable connector element, said base having an opening through which the at least one cable connected to the cable connector element can be guided, wherein the base is designed to positively enclose a cable-side end face of the cable connector element, wherein the securing element body has at least two snap hooks that extend in the plug-in direction that in each case have a latching element, such as a latching lug, at their free end.

The latching elements of the snap hooks can engage with a mating latching element after or upon connection of the cable plug-in element with a mating plug-in element. The mating latching element may be connected to the mating connector element but does not need to be. The mating latching element can also be mounted separately on a printed circuit board that is to be connected to the cable connector element, or on a housing part. Compared to conventional lockable connectors in which the connector elements additionally have latching elements for securing the connection, the connector to be secured and the mating latching element can thus be designed depending on the specific space requirements. The securing element according to the present disclosure thus makes possible a compact design of the connector, as required, for use in a process metrology probe.

The securing element body may have an end face surrounding the receptacle, wherein the snap hooks extend perpendicular thereto, starting from the end face.

The securing element body can have a slot running through the opening in the base of the receptacle at an angle, such as orthogonally, to a longitudinal direction of said receptacle, the longitudinal extension of the slot being adapted to the cable connector element in such a way that the cable connector element can be pushed through the slot. This embodiment allows the cable connector element to be inserted from behind into the receptacle through the slot. After rotating the cable plug connector element by the angle that the slot forms with the longitudinal direction of the receptacle, a cable-side segment of the cable plug connector element can be introduced into the receptacle and be positively held in this by means of the base engaging behind its cable-side end face.

In one embodiment, the securing element body can have at least one spacer extending in the direction opposite the snap hooks. In another embodiment, the securing element body can have at least two spacers extending in the direction opposite the snap hooks. As will be described in more detail below, in the connected state, the spacers can serve to prevent a movement of the securing element and/or of the connector, said securing element and/or connector being locked by the securing element, in the direction of a sleeve surrounding the cable.

The snap hooks can be provided with holes which extend from the rear side of the securing element body, facing away from the snap hooks, into the snap hooks in the longitudinal direction. This allows the insertion of a tool into the holes, with which tool the snap hooks can be deflected outwardly in order to release an engaged connection again.

The securing element body can advantageously be produced using injection-molding process or using an additive manufacturing process. This type of manufacturing is flexible and makes it possible to adapt the specific dimensions of the securing element body, such as the length of the snap hooks, the shape of the latching elements, and the length of the spacers, to the specific circumstances of a connector to be secured with the securing element. An additive manufacturing method is understood to mean automated processes which produce three-dimensional objects directly from a data set, wherein, for example, volume elements are, joined layer by layer onto or to one another. Examples of these methods are rapid prototyping or 3D printing (powder binder method). However, the securing element body can alternatively also be produced by machining, such as turning or milling.

The present disclosure also comprises a printed circuit board assembly having a printed circuit board, a connector, and a securing element according to any one of the embodiments described above, wherein the connector has a cable connector element and a mating connector element fastened to the printed circuit board, which mating connector element is complementary to the cable connector element. The cable connector element can have a segment connected to at least one cable. In order to secure the connector against unintended disengagement, the receptacle of the securing element body of the securing element can encompass the segment of the cable connector element that is connected to the at least one cable, and the at least one cable can be guided through the opening in the base of the receptacle in such a way that the base positively surrounds the segment of the cable connector element.

The printed circuit board can have mating latching elements complementary to the latching elements of the snap hooks of the securing element, wherein the latching elements and mating latching elements can be latched into one another if the cable connector element and the mating connector element are connected to one another in such a way that a movement of the securing element and the cable connector element received therein is prevented in the direction opposite the plug-in direction.

The printed circuit board can have a first sheet-metal contacting element arranged as a first mating latching element on a first side of the printed circuit board, and a second sheet-metal contacting element as a second mating latching element arranged opposite the first sheet-metal contacting element, on a second side of the printed circuit board opposite the first side. A latching element, such as a latching lug, of a first of the snap hooks of the securing element body engages at an edge of the first sheet-metal contacting element, and wherein a latching element, such as a latching lug, of a second of the snap hooks of the securing element body engages at an edge of the second sheet-metal contacting element, so that a movement of the securing element and of the cable connector element received therein is prevented in the direction opposite the plug-in direction. The first sheet-metal contacting element can be arranged in such a way that it overlaps the connector, such as the mating connector element or a segment of the cable connector element projecting from the receptacle of the securing element.

The sheet-metal contacting elements simultaneously serve to contact a cable shield, for example in the form of a shielding braid or shielding sleeve attached to the sheet-metal contacting elements, and thus fulfill two functions. In this embodiment, as components of the printed circuit board which are already present anyway, they thus simultaneously provide latching edges which serve to engage the latching elements of the securing element body, and thus to secure the connector. Additional components or projecting connectors with locking elements are thus not required, so that a compact design of the printed circuit board assembly is achieved. This is advantageous for the use of the printed circuit board assembly in a process metrology probe.

The printed circuit board assembly can further comprise a sleeve, wherein the cable connector has a segment connected to at least one cable on its side facing away from the mating connector element, wherein the cable is surrounded by the sleeve, guided through the sleeve, at least in one segment. The sleeve can have an end face facing toward the securing element, wherein the securing element body has at least one spacer extending in the direction opposite the snap hooks, the free end of said spacer pointing toward the end face of the sleeve and spaced apart therefrom. The distance between the free end of the spacer and the end face is less than 1 mm from the end face. In another embodiment, the securing element body can have at least two, as well as more than two, spacers extending in the direction opposite the snap hooks. As already mentioned above, the spacers prevent an unwanted movement, in the direction of the sleeve, of the cable connector that has been received in the securing element, or, in the event that the cable plug is connected to the mating connector element, of the circuit board with the connected connector. A short distance of the free ends of the spacers from the end face of the sleeve serving as a stop surface is advantageous, since a continuous compressive force would be exerted on the connector or printed circuit board given direct contact of the spacer at the stop surface.

The present disclosure also comprises a probe for optical measurements in a measuring medium, e.g., a measuring fluid. The probe comprises a probe housing, such as a tubular probe housing; a sensor head connected to a first end of the probe housing; a sensor assembly, for example an optical module, accommodated in the sensor head; a cable assembly having a sleeve, said cable assembly being connected to a second end of the probe housing situated opposite the first end; a circuit board accommodated in the probe housing and having a sensor circuit; a first connector which connects, such as electrically conductively, the sensor assembly accommodated in the sensor head to the sensor circuit, a second connector and a securing element according to any one of the embodiments described above, wherein the second connector has a cable connector element having a segment connected to at least one cable; wherein the receptacle of the securing element body encompasses the segment of the cable connector element connected to the at least one cable, and the at least one cable is guided through the opening in the base of the receptacle in such a way that the base positively surrounds the segment of the cable connector element; and wherein the second connector further comprises a mating connector element fastened to the printed circuit board and complementary to the cable connector element. The second connector serves to connect the sensor circuit to the at least one cable.

The sleeve can be part of the cable assembly which serves for, among other things, sealing the sensor housing toward the rear, wherein the at least one cable connected to the cable connector element for transmitting measurement signals of the probe, or of the sensor circuit, is guided out of the sensor housing in a liquid-tight manner through the sleeve to higher-level electronics, e.g. a measuring transducer or another computer, e.g. an industrial PC. The cable connector element can be connected to a plurality of cables which are guided through the sleeve and guided out of the cable assembly as individual wires of a multicore cable exiting from the cable assembly.

The sensor head can be connected, in other words screwed, to the first end of the probe housing, for example via a thread. The sensor assembly accommodated in the sensor head can be an optical module having one or more radiation sources, e.g. LEDs, and one or more radiation receivers, e.g. photodiodes. In addition, the sensor assembly may comprise a temperature sensor. The sensor assembly can have a connector element which can be connected to a complementary connector element arranged on the printed circuit board in order to form the first connection.

The sensor head can moreover contain measurement windows for coupling and/or decoupling measuring radiation into the measuring medium and, after interaction with the measuring medium, back into the sensor head, as well as sensor circuit elements.

The printed circuit board can have mating latching elements complementary to the latching elements of the snap hooks of the securing element, wherein the latching elements and mating latching elements can be latched into one another when the cable connector element and the mating connector element are connected to one another in such a way that a movement of the securing element is prevented in the direction opposite the plug-in direction.

The printed circuit board can have a first sheet-metal contacting element arranged as a first mating latching element on a first side of the printed circuit board, and a second sheet-metal contacting element as a second mating latching element arranged on a second side of the printed circuit board, opposite the first sheet-metal contacting element; wherein a latching element, such as a latching lug, of a first of the snap hooks of the securing element body engages at an edge of the first sheet-metal contacting element; and wherein a latching element, such as a latching lug, of a second of the snap hooks of the securing element body engages at an edge of the second sheet-metal contacting element, so that a movement of the securing element is prevented in the direction opposite the plug-in direction. The first sheet-metal contacting element can be arranged in such a way that it overlaps the connector, such as the mating connector element or a segment of the cable connector element projecting from the receptacle of the securing element. As described further above, this embodiment is comparatively compact and may be suitable for use in a probe.

The at least one cable connected to the cable connector element can be surrounded in at least one segment by the sleeve of the cable assembly, such a to be guided through the sleeve, wherein the sleeve has an end face facing the securing element, and wherein the securing element body has at least one spacer extending in the direction opposite the snap hooks, the free end of which spacer points toward and is spaced apart from the end face of the sleeve. The distance between the free end of the spacer and the end face is advantageously less than 1 mm from the end face. In an advantageous embodiment, the securing element body can have at least two spacers extending in the direction opposite the snap hooks, which spacers are correspondingly distanced from the end face of the sleeve.

In this embodiment, the securing element can additionally serve to prevent an unintended release of the second connector, i.e. the connector between the sensor head and the circuit board. This can occur if the printed circuit board moves in the direction of the cable away from the sensor head, for example due to vibrations or oscillations being coupled into the probe housing. This movement is prevented by the spacers.

BRIEF DESCRIPTION OF THE DRAWINGS

In the following, the present disclosure is described in more detail using the exemplary embodiments shown in the figures. Identical components are in each case identified by the same reference symbols in different figures. The following are shown.

DETAILED DESCRIPTION

Figure 1:
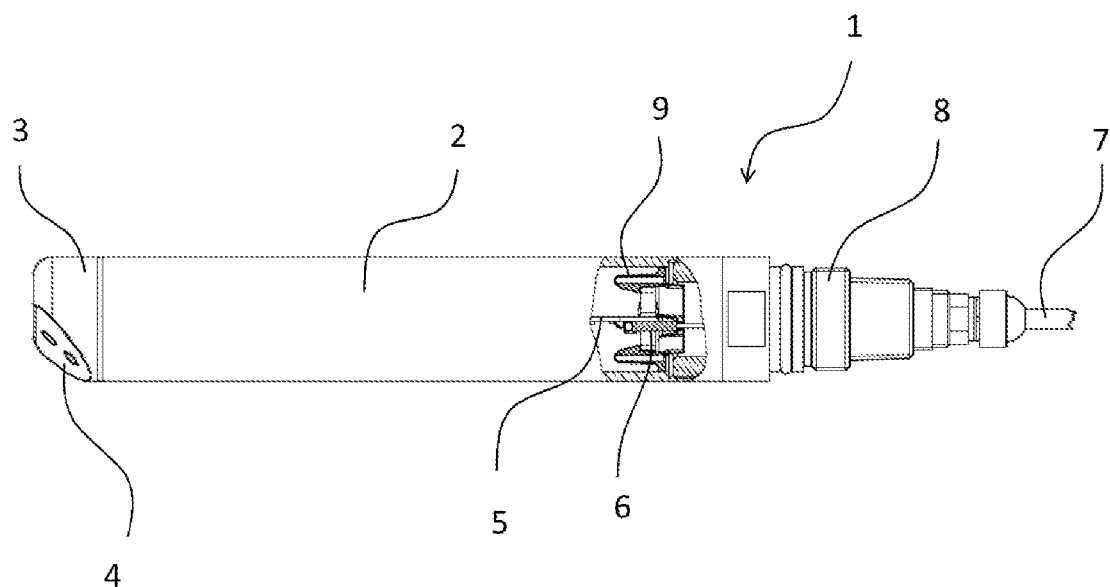
FIG. 1 shows a side view of a probe for optical measurements in a measuring medium.
Figure 2:
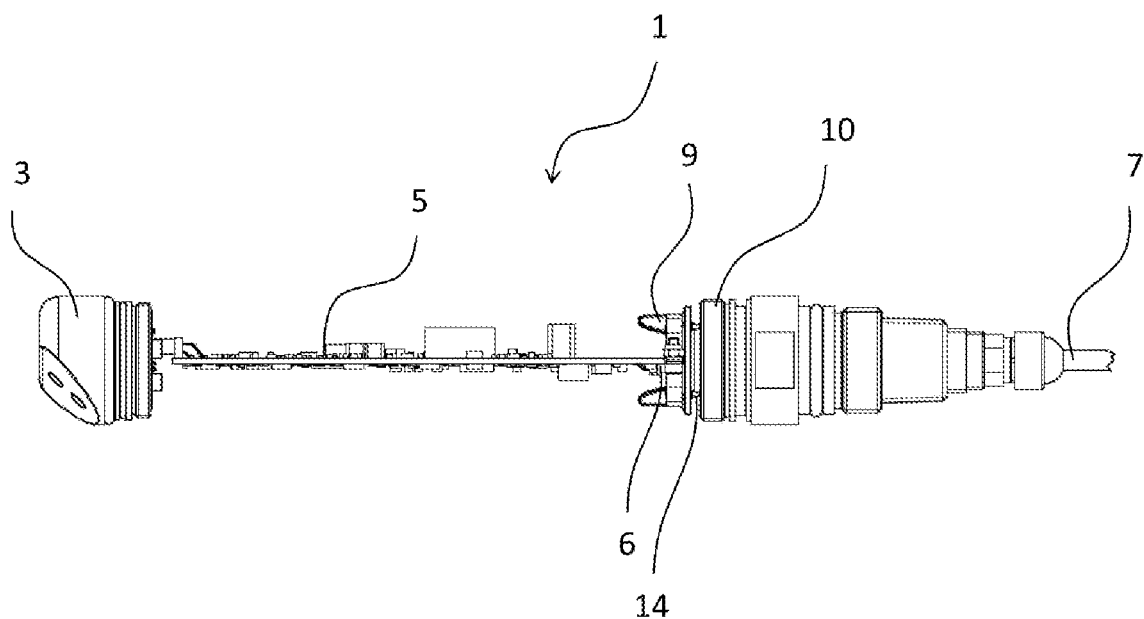
FIG. 2 shows a side view of the probe according to FIG. 1, without its tubular probe housing.

Shown in FIG. 1 and FIG. 2 is a probe 1 for optical measurements in a measuring medium, for example a measuring fluid. The probe 1 is suitable for use in process metrology, for example for measuring a parameter of a process fluid. In the present example, the probe 1 is designed to measure the turbidity of a measuring fluid. It has a tubular probe housing 2, at the first end of which a sensor head 3 intended for immersion in the measuring medium is screwed on. In FIG. 2 the probe is shown without the tubular probe housing 2.

In the example described here, the sensor head 3 contains a sensor assembly having one or more radiation sources and one or more radiation detectors. The sensor head 3 has a sensor surface 4 in which windows are arranged. The windows serve to decouple radiation of the radiation sources from the sensor head 3 into a measuring medium, and to couple measuring radiation scattered at particles or gas bubbles in the measuring medium back into the sensor head 3. Using the measuring radiation intensity received by the detectors contained in the sensor head 3, the optical sensor assembly generates a primary measurement signal that represents a measured value of the turbidity of the measuring medium.

The second end of the tubular probe housing 2, opposite the sensor head 3, is closed off by a cable assembly 8. Arranged in the probe housing 2 is a printed circuit board 5 which is connected on the one hand via a first connector to the sensor assembly contained in the sensor head 3, and on the other hand to the cable assembly 8 via a second connector 6. The cable assembly 8 has a housing with a sleeve 10, through which are guided one or more individual cables connected to the circuit board 5 by means of the second connector. A probe cable 7 is guided out of the cable assembly 8. The probe cable 7 can comprise the one or more individual cables connected to the printed circuit board 5 as wires. It serves for being connected to a higher-level data processing device, for example a measuring transducer or another computer, which receives probe signals and/or which outputs to the probe 1 control commands or parameters for the measurement.

The circuit board 5 has an electrical sensor circuit which serves to process, such as to amplify, the primary measurement signals received by the radiation detector or radiation detectors, and to process data received from the higher-level data processing unit. The sensor circuit moreover serves to relay probe signals generated from the primary measurement signals to the higher-level data processing device via the probe cable 7. The first connector serves for the electrical connection of the sensor assembly to the sensor circuit. The second connector 6 accordingly serves for the electrical connection of the sensor circuit to the probe cable 7.

In order to secure the second connector 6 between the printed circuit board 5 and the cable assembly 8, the probe 1 has a securing element 9 which is described below with reference to FIGS. 3a to c.

Figure 3A:
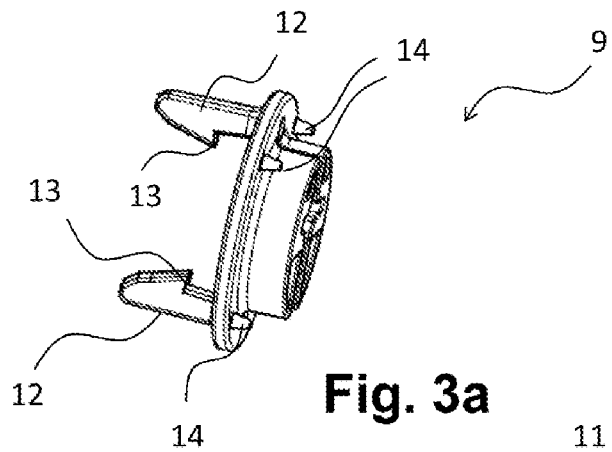
FIG. 3a,b,c shows a securing element for a connector, in views from three different perspectives.
Figure 3B:
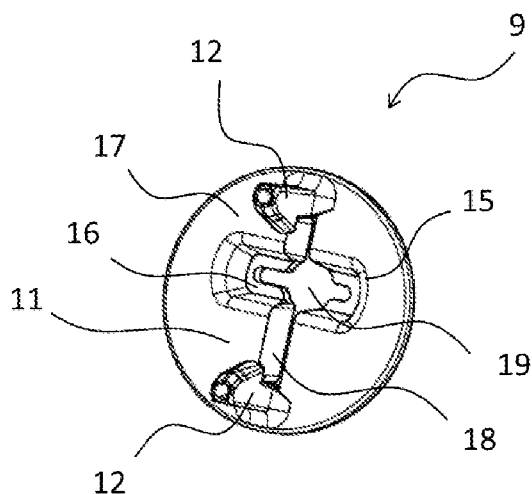
Figure 3C:
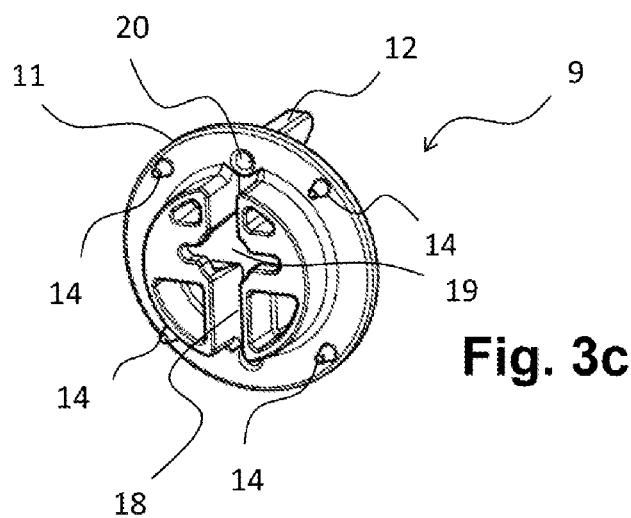

In FIGS. 3a, 3b, and 3c, the securing element 9 is shown from three different perspectives. It has a securing element body 11 which can be produced from plastic, for example, by means of an injection-molding process or by means of an additive manufacturing process.

In the example shown here, the securing element body 11 has a disk-shaped base body on which two snap hooks 12 are formed. The snap hooks 12 project in the perpendicular direction from a face 17 of the disk-shaped base body of the securing element body 11 and have a latching lug 13 at their free end. In the securing element body 11, a receptacle 15 serving as a receptacle for a cable connector element of the second connector of the probe 1 is also formed, which receptacle 15 serves as an elongated recess, surrounded by the face 17, in the disk-shaped base body, said base body having a base 16 that is lowered relative to the face 17. The two snap hooks 12 are arranged on opposite sides of the receptacle 15. A slot 18 runs perpendicular to the longitudinal extension of the receptacle 15, through the securing element body 11 and through the base 16 of the receptacle 15. In the base 16, the slot 18 is widened toward an opening 19. In the present example, a further slot runs perpendicular to the slot 18, through the base 16 such that an intersection point between the two slots forms the opening 19.

The length of the slot 18 is dimensioned in such a way that a cable connector element 22 connected to one or more cables (FIG. 4) can be pushed through the slot 18 from the rear. After a subsequent rotation of the securing element body 11 by 90° relative to the cable connector element 22, the cable-side end of the cable connector element 22 can be pushed back into the receptacle 15 so that the base 16 engages behind a cable-side end face of the cable connector element 22, wherein the cable or cables 21 connected to the cable connector element 22 are guided through the opening 19. The cable-side end of the cable connector element 22 is thus positively held in the receptacle 15.

Figure 4:
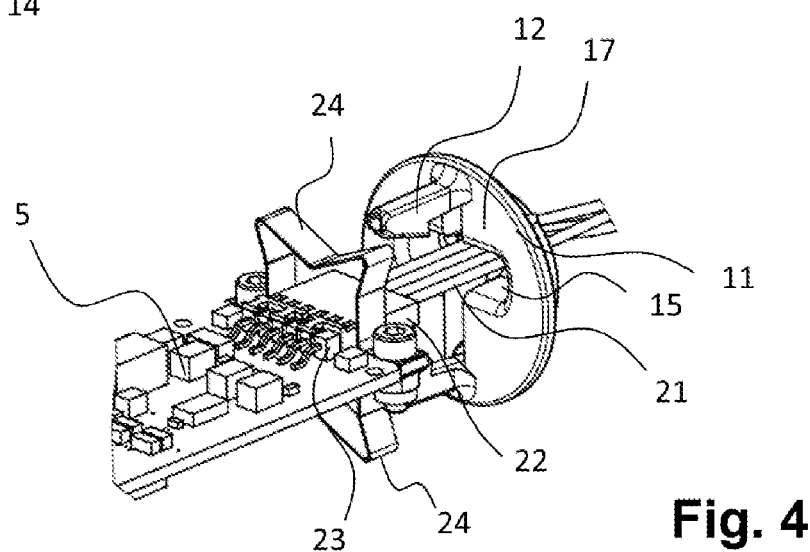
FIG. 4 shows a connector that connects to a plurality of cables a printed circuit board of the probe depicted in FIG. 1, as well as the securing element according to FIGS. 3a, b and c in a first, non-engaged position.
Figure 5:
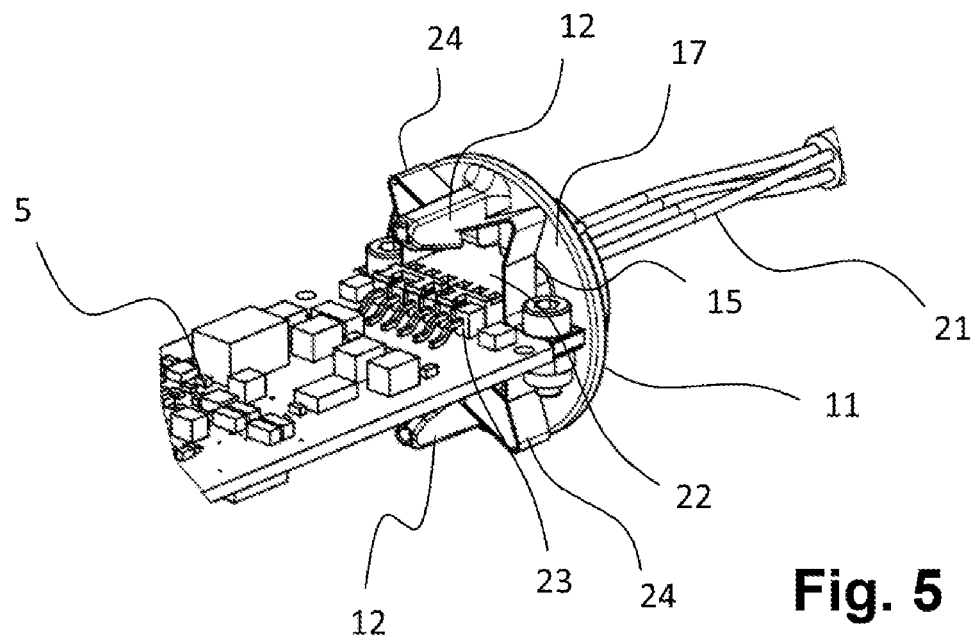
FIG. 5 shows the connector depicted in FIG. 4, with the securing element in a second, engaged position.

Shown in detail in FIG. 4 and FIG. 5 is the connector between the printed circuit board 5 and the cable 7 of the probe 1 that is shown in FIGS. 1 and 2. In FIG. 4, the connector 6 formed by the cable connector element 22 and the mating connector element 23 arranged on the printed circuit board 5 has not yet been secured by the securing element 9. The cable connector element 22 is connected to a plurality of individual cables 21 which are guided through the opening 19 in the securing element body 11 and, in the cable assembly 8 arranged downstream thereof (not shown in FIG. 4), are joined together as wires of the probe cable 7. In FIG. 4 the securing element 9 is oriented in such a way that the receptacle 15 can be pushed over the cable-side end of the cable connector element 22 via a movement of the securing element 9 in the plug-in direction.

Arranged on each side of the circuit board 5 is a sheet-metal contacting element 24 which, in the present example, overlaps a segment of the cable connector element 22 on the circuit board side. The sheet-metal contacting elements 24 serve to connect a shield braid for EMC shielding of the sensor circuit arranged on the printed circuit board 5.

If, as shown in FIG. 5, the securing element 9 is pushed over the cable-side end of the cable connector element 22 so that its cable-side end is accommodated in the receptacle 15 and positively held therein, the latching lugs 13 of the snap hooks 12 will in each case engage at an edge of the sheet-metal contacting element 24 facing away from the securing element 9. In this position, the face 17 of the securing element body 11 abuts against the opposite edge of the sheet-metal contacting elements 24. An unintended release of the connector 6 is thereby prevented by positive locking of the securing element 9.

The securing element 9 simultaneously also serves to secure the connector between the printed circuit board 5 and the sensor head 3. In FIGS. 3a and 3c, it is can be seen that the sensor element body 11 has, on its rear side facing away from the snap hooks 12, four spacers 14 which extend from the rear surface of the sensor element body 11 in the direction opposite the snap hooks 12. In the assembled state of the probe, these spacers 14 point in the direction of the sleeve 10 of the cable assembly 8 (FIG. 2). A movement of the printed circuit board 5 in the direction of the sleeve 10, which could lead to an unintended release of the connector between the printed circuit board 5 and the sensor head 3, is thus prevented by the spacers 14 striking the end face of the sleeve 10, which serves as a stop face and faces the printed circuit board 5. Advantageously, the free end of the spacers 14 has a clearance of more than 0.2 mm and less than 1 mm from the end face of the sleeve 10, in order to prevent a continuous compressive force from being exerted on the connector 6 between the mating connector element 23 and the cable connector element 22, or on the printed circuit board 5.

Since, in the present example, the securing element body 11 is produced by an additive manufacturing method or an injection-molding method, it is possible to adapt the length of the spacers 14 and/or of the snap hooks 12 to various sensor types. If produced via an injection-molding method, this can be realized by inserts or sliders in the mold cavity, for example. The securing element 9 can thus be used in a very similar manner in a wide variety of probes.

Figure 6:
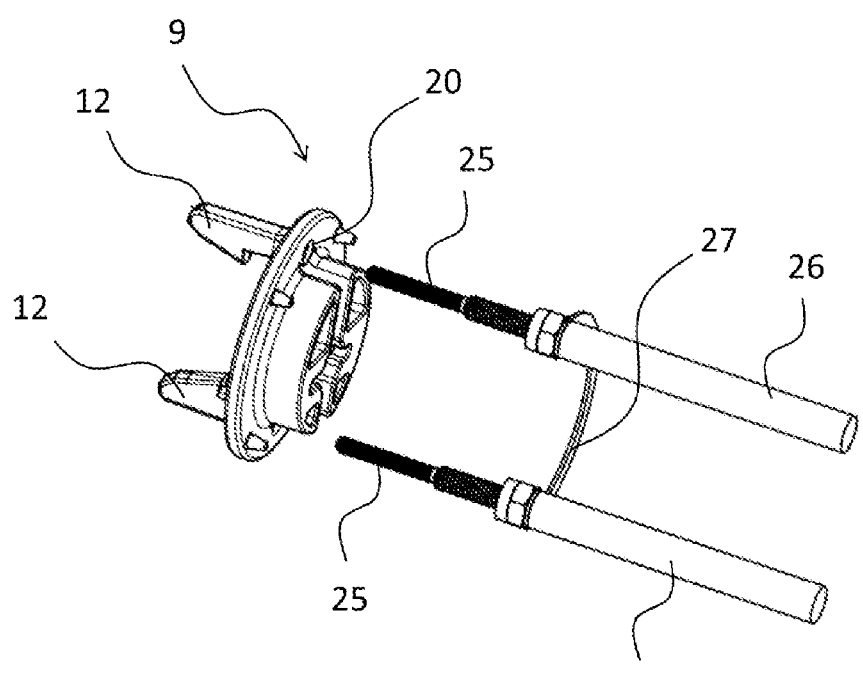
FIG. 6 shows the securing element according to FIGS. 3a, b and c, and a tool for deflecting the snap hooks of the securing element.

In order to release the connector between cable connector element 22 and the mating connector element 23, the snap hooks 12 can be angled outwardly in order to lift the latching lugs 13 off the sheet-metal contact elements 24. For this purpose, the securing element body 11 has holes 20 running inside the snap hooks 12 (FIG. 3c) which are accessible from the rear side of the securing element body 11 facing away from the snap hooks 12. Shown in FIG. 6 is a tool that has two arms 25 that can be inserted into the holes 20. The arms 25 merge in each case into a handle 26 and can be connected to one another at the transition point by means of an elastically deformable spring element 27. However, it is also possible to use the two arms 25 separately. By bringing the handles 26 together, the arms 25 are deflected and thus tilt the two snap hooks 12 out of the perpendicular, such that the latching lugs are lifted off the sheet-metal contacting elements 24 and allow a movement of the securing element 9 counter to the plug-in direction of the cable connector element 22. After the securing element 9 is released, the connector 6 can likewise be released.

It goes without saying that the exemplary embodiment described above can be modified in numerous ways without departing from the inventive idea. In the present example, the sheet-metal contacting elements of the printed circuit board thus serve as mating latching elements for the snap hooks of the securing element. However, it is possible to provide different types of mating latching elements. The snap hooks can similarly be designed in a different form from latching elements. The number of snap hooks and spacers can also in each case be adapted to the requirements of the respective connector that is to be secured.

The securing element according to the present disclosure, or the printed circuit board assembly with connector and securing element, can be used as described here in a turbidity probe. It can equally be used in other measuring probes intended for immersion in a measuring medium, e.g. a measuring fluid, for example in a SAC or nitrate probe or in a spectrometer probe.

The invention claimed is:

1. A securing element for a connector, comprising: a securing element body having a receptacle that is designed to encompass at least one rear segment of a cable connector element connected to at least one cable, and having a base running substantially perpendicular to the connection direction of the cable connector element, said base having an opening through which the at least one cable connected to the cable connector element can be guided, wherein the base is designed to positively enclose a cable-side end face of the cable connector element, and wherein the securing element body has at least two snap hooks that extend in the plug-in direction and that in each case have a latching element at their free end, wherein the securing element body has a slot running through the opening, wherein the flow being adapted to the cable connector element in such a way that the cable connector element can be pushed through the slot.

2. The securing element according to claim 1, wherein the securing element body has an end face surrounding the receptacle, and wherein the snap hooks extend perpendicular thereto, starting from the end face.

3. The securing element according to claim 1,
wherein the securing element body has at least one spacer extending in the direction opposite the snap hooks.

4. The securing element according to claim 1,
wherein the snap hooks are provided with holes which extend from the rear side of the securing element body, facing away from the snap hooks, into the snap hooks in the longitudinal direction.

5. The securing element of claim 1,
wherein the securing element body is produced by means of an injection-molding process or by means of an additive manufacturing process.

6. A circuit board assembly comprising a circuit board, a connector, and a securing element,
wherein the connector has a cable connector element having a segment connected to at least one cable; wherein the receptacle of the securing element body surrounds the segment of the cable connector element connected to the at least one cable, and the at least one cable is guided through the opening in the base of the receptacle in such a way that the base positively surrounds the segment of the cable plug connector element,
and wherein the connector further comprises a mating connector element fastened to the printed circuit board and complementary to the cable connector element,
wherein the securing element body has a slot running through the opening in the base of the receptacle, wherein the slot being adapted to the cable connector element in sauch a way that the cable connector element can be pushed through the slot.

7. The circuit board assembly according to claim 6,
wherein the printed circuit board has mating latching elements complementary to the latching elements of the snap hooks of the securing element, and wherein the latching elements and mating latching elements can be latched into one another when the cable connector element and the mating connector element are connected to one another in such a way that a movement of the securing element and the cable connector element received therein is prevented in the direction opposite the plug-in direction.

8. The circuit board assembly according to claim 6,
wherein the printed circuit board has a first sheet-metal contacting element arranged as a first mating latching element on a first side of the printed circuit board, and a second sheet-metal contacting element as a second mating latching element opposite the first sheet-metal contacting element, arranged on a second side of the printed circuit board opposite the first side,
and wherein a latching element of a first snap hook of the securing element body engages at an edge of the first sheet-metal contacting element, and wherein a latching element of a second snap hook of the securing element body engages at an edge of the second sheet-metal contacting element, so that a movement of the securing element is prevented in the direction opposite the plug-in direction.

9. The circuit board assembly according to claim 6,
further comprising a sleeve,
wherein the at least one cable connected to the cable connector element can be surrounded in at least in one segment by the sleeve being guided through the sleeve, wherein the sleeve has an end face facing the securing element,
and wherein the securing element body has at least one spacer extending in the direction opposite the snap hooks, the free end of which spacer points toward and is spaced apart from the end face of the sleeve.

10. A probe for optical measurements in a measuring medium, comprising:
a probe housing;
a sensor head connected to a first end of the probe housing;
a sensor assembly accommodated in the sensor head;
a cable assembly having a sleeve, said cable assembly being connected to a second end of the probe housing situated opposite the first end;
a printed circuit board, accommodated in the probe housing, which has a sensor circuit;
a first connector which connects the sensor assembly accommodated in the sensor head to the sensor circuit
a second connector and a securing element according to claim 1, wherein the second connector has a cable connector element having a segment connected to at least one cable; wherein the receptacle of the securing element body encompasses the segment of the cable connector element connected to the at least one cable, and the at least one cable is guided through the opening in the base of the receptacle in such a way that the base positively surrounds the segment of the cable connector element; and wherein the second connector further comprises a mating connector element fastened to the printed circuit board and complementary to the cable connector element.

11. The probe according to claim 10,
wherein the printed circuit board has mating latching elements complementary to the latching elements of the snap hooks of the securing element, and wherein the latching elements and mating latching elements can be latched into one another when the cable connector element and the mating connector element are connected to one another in such a way that a movement of the securing element is prevented in the direction opposite the plug-in direction.

12. The probe according to claim 10,
wherein the printed circuit board has a first sheet-metal contacting element arranged as a first mating latching element on a first side of the printed circuit board, and a second sheet-metal contacting element as a second mating latching element opposite the first sheet-metal contacting element, arranged on a second side of the printed circuit board opposite the first side,
wherein a latching element a latching lug of a first snap hook of the securing element body engages at an edge of the first sheet-metal contacting element; and wherein a latching element, of a second snap hook of the securing element body engages at an edge of the second sheet-metal contacting element, so that a movement of the securing element is prevented in the direction opposite the plug-in direction.

13. A system according to claim 10,
wherein the at least one cable connected to the cable connector element can be surrounded in at least in one segment by a sleeve of the cable assembly being guided through the sleeve, wherein the sleeve has an end face facing toward the securing element,
and wherein the securing element body has at least one spacer extending in the direction opposite the snap hooks, the free end of which spacer points toward and is spaced apart from the end face of the sleeve.

* * * * *